(No Model.) 3 Sheets—Sheet 1.
F. E. LEIBNITZ.
PASSENGER RECORDER FOR SLEEPING CAR BERTHS.
No. 417,051. Patented Dec. 10, 1889.
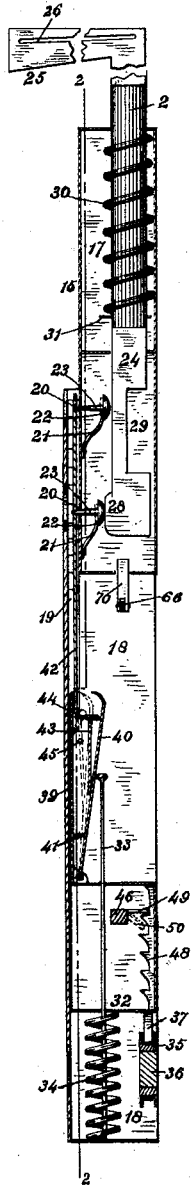
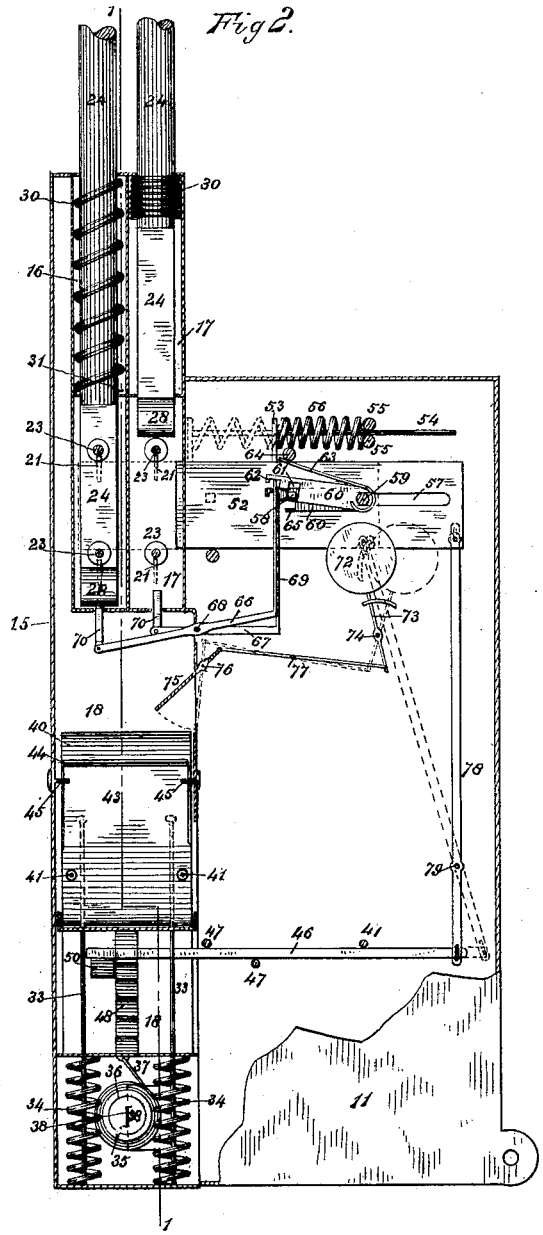
WITNESSES
C. A. Weed.
R. E. Somes.
INVENTOR
F. E. Leibnitz
By F. C. Somes,
Attorney (No Model.) 3 Sheets—Sheet 2.
F. E. LEIBNITZ.
PASSENGER RECORDER FOR SLEEPING CAR BERTHS.
No. 417,051. Patented Dec. 10, 1889.
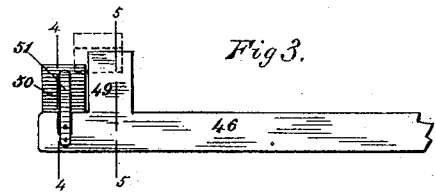
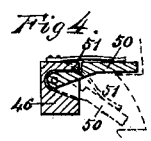
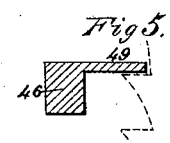
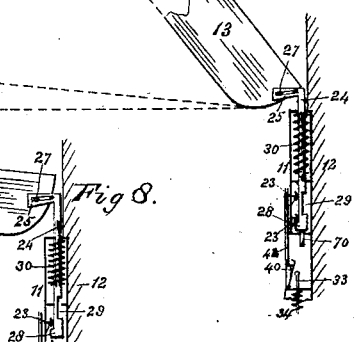
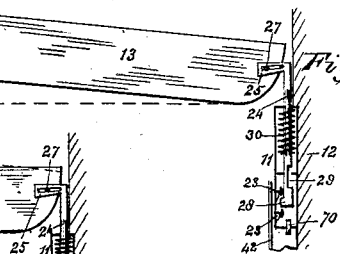
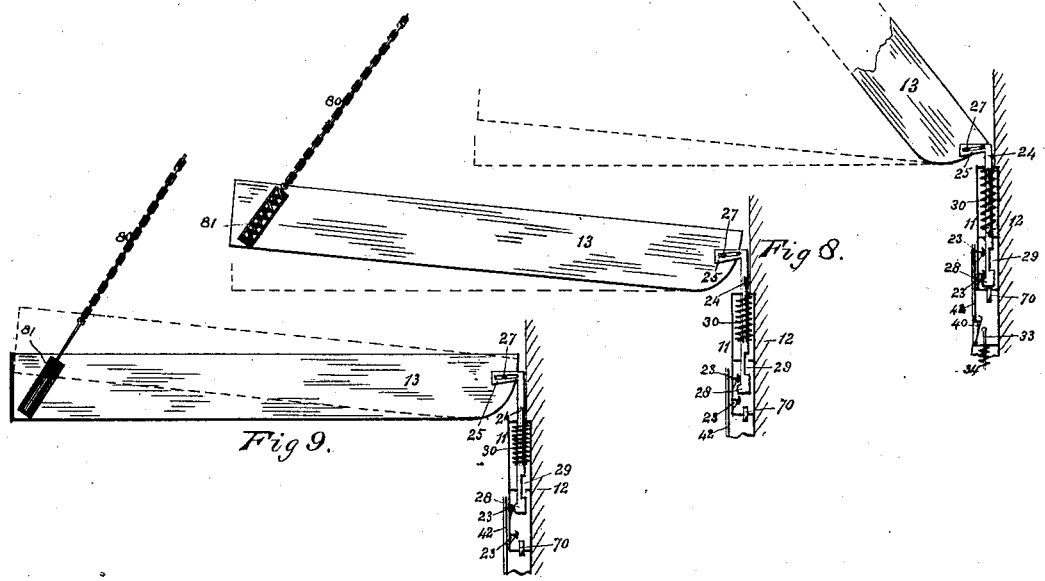
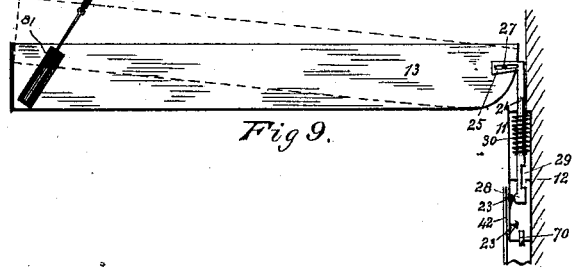
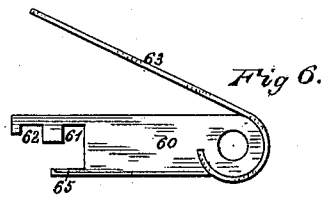
WITNESSES
INVENTOR (No Model.) 3 Sheets—Sheet 3.
F. E. LEIBNITZ.
PASSENGER RECORDER FOR SLEEPING CAR BERTHS.
No. 417,051. Patented Dec. 10, 1889.
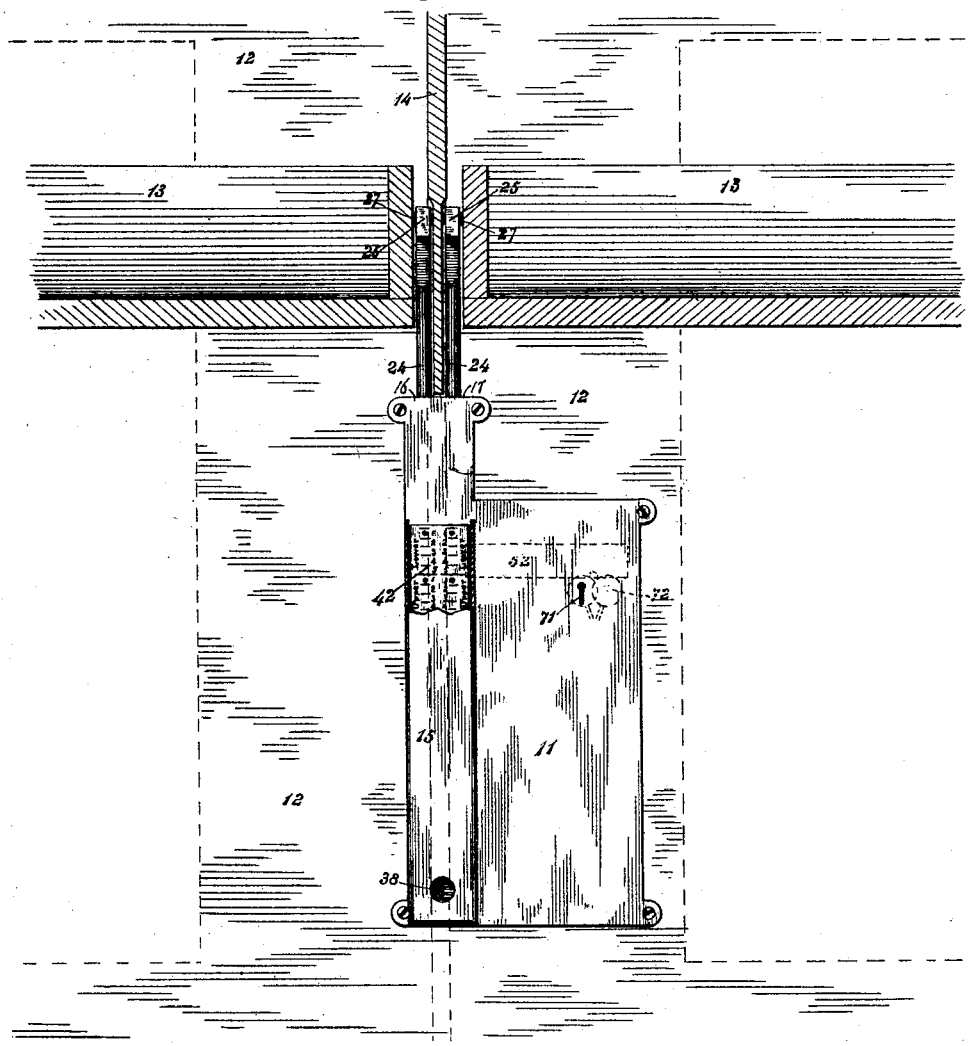
WITNESSES:
C. A. Weed.
R. E. Somes.
INVENTOR:
F. E. Leibnitz
By his Att'y.
F. E. Somes.
N. PETERS. Photo-Lithographer. Washington. D. C.

UNITED STATES PATENT OFFICE.

FREDERICK EDWARD LEIBNITZ, OF BIRMINGHAM, ALABAMA.

PASSENGER-RECORDER FOR SLEEPING-CAR BERTHS.

SPECIFICATION forming part of Letters Patent No. 417,051, dated December 10, 1889.

Application filed March 1, 1889. Serial No. 301,605. (No model.)

*To all whom it may concern:*

Be it known that I, FREDERICK EDWARD LEIBNITZ, a citizen of the United States, residing at Birmingham, in the county of Jefferson and State of Alabama, have invented certain new and useful Improvements in Passenger-Recorders for Sleeping-Car Berths, of which the following is a specification.

This invention relates to a device for automatically recording the use of berths in sleeping-cars, said device serving as a check upon sleeping-car conductors and enabling the sleeping-car company to ascertain the exact number of berths sold or used.

The objects of this invention are to provide a recorder which will record the use of both the upper and lower berths of a sleeping-car, and which will lock the upper berth or berths in closed position until the record-slip is placed in the recorder.

This recorder is designed for connection with the hinged upper berth of a sleeping-car, and comprises a mechanism for receiving and holding a record slip or ticket, a mechanism whereby the record-slip is punched once to record the use of the lower berth on the opening of the upper berth to remove the bedclothing for the lower berth, and whereby the record-slip is punched again to record the use of the upper berth on the depression of the latter to its normal open position by the weight of the occupant on entering, a locking mechanism for locking the berth and punching mechanism until the slip is placed in the recorder, and a mechanism for unlocking the berth and punching mechanism on the insertion of the record-slip in the recorder. These mechanisms or parts thereof, whether taken severally or collectively, constitute certain novel features hereinafter claimed.

Figure 1 of the accompanying drawings represents a vertical section of this improved passenger-recorder for sleeping-car berths on line 1 1 of Fig. 2, the upper portion of the punching-bolt being broken off. Fig. 2 represents a vertical section on line 2 2 of Fig. 1, showing a front elevation of this improved passenger-recorder with the greater portion of the face-plate removed and the punching-bolts broken off. Fig. 3 is an enlarged plan of one end of the bolt for locking the carriage carrying the record-slip. Fig. 4 represents a transverse section of the slip-carriage-locking bolt on line 4 4 of Fig. 3. Fig. 5 represents a transverse section of the slip-carriage-locking bolt on line 5 5 of Fig. 3. Fig. 6 represents an enlarged side elevation of one of the tumblers of the lock for locking the punching-bolts and the spring attached to said tumbler. Fig. 7 is a diagram representing the passenger-recorder in use, the different positions of the upper berth being indicated by full and dotted lines and the punching-bolt being shown in the position which it assumes when the berth is closed. Fig. 8 represents the upper berth as opened for the removal of the bedclothing for the lower berth and the punching-bolt in the position which it assumes after actuating the punch for recording the use of the lower berth. Fig. 9 represents the upper berth and punching-bolt in the positions which they assume after a passenger has entered and depressed the upper berth and caused the slip to be punched for the use of the upper berth. Fig. 10 represents a front elevation of this improved recorder applied to the wall of a sleeping-car and having the punching-bolts connected with the upper berths of two adjacent "sections" or compartments.

The same numerals of reference indicate the same or corresponding parts in the different figures.

Referring to the drawings, this improved passenger-recorder 11 is fastened to the inside window-panel 12 of the sleeping-car below the upper berths 13 and beneath the head-board or partition 14 between said berths.

The recorder comprises a metallic casing 15, which has two adjacent bolt-pockets 16 and 17 disposed at one of its upper corners, a pocket 18 for the slip-carriage disposed below the bolt-pockets, and a slip-pocket 19 for the record-slip disposed at the front of the casing and overlapping the lower ends of the bolt-pockets and upper end of the carriage-pocket.

Each of the vertical bolt-pockets 16 and 17 is provided in its front wall opposite the slip-pocket 19 with two small punch-holes 20, disposed one above the other. Spring-arms 21 are attached to the inner face of said bolt-pockets and provided with eyes 22 at their free ends, said eyes being opposite the punch-holes 20 in said pockets. Two small-headed punches 23 are carried in the eyes of said spring-arms, the points of said punches projecting through the punch-holes 20 in the bolt-pockets.

Two similar vertically-sliding punching-bolts 24 are disposed in the bolt-pockets 16 and 17. Each of these sliding bolts constitutes an actuating-bolt for the recording mechanism, and is provided at its upper end with a laterally-projecting arm 25, having a horizontal slot 26. The upper berths at their adjacent ends are provided with studs 27, which engage the slotted arms 25 of the punching-bolts, the upper berth of one section engaging one of said bolts and the upper berth of the adjoining section engaging the other punching-bolt, so that one recorder suffices for two sections, including four berths, as shown in Fig. 10.

Each of the punching-bolts 24 is provided at its lower end on its front face with a cam 28 for engaging and actuating the punches 23, and on its rear face with a recess 29 for receiving a locking-bolt.

Springs 30 are disposed within the bolt-pockets 16 and 17 around the punching-bolts 24, respectively, their upper ends bearing against the tops of the bolt-pockets and their lower ends against collars or pins 31 on the bolts. These springs tend to hold the punching-bolts in their normal positions, ready to actuate the punches when the upper berths are swung open.

The slip-carriage comprises a slide 32, a pair of jaws 39 and 40, attached to the slide, an automatic jaw-opener therefor, and means for actuating said carriage. The slide 32 consists of a rectangular box or frame disposed on a vertical rod 33 within the pocket 18 for the slip-carriage. An expansive spring 34 is disposed within said pocket below said slide and tends to push the latter upward. A winding-drum 35 turns on a journal 36, attached to the wall of said pocket, as best shown in Fig. 1, and a band 37 is connected at one end to the slide and at the other end to the drum. When the slide 32 has reached the upper end of its movement, it is drawn back by means of the band and winding-drum 35, a key being inserted in a key-hole 38 in the drum for turning it.

The slide 32 carries a rigid jaw 39 and a swinging jaw 40, the swinging jaw being connected with the rigid jaw by a contractile spring 41, which tends to draw the jaws together for clamping the lower end of the record-slip 42, which projects through the slip-pocket 19 when inserted therein by the conductor.

A jaw-opener is provided for opening the jaws to receive the record-slip. The jaw-opener shown comprises an arm 43, attached to the inner face of the swinging jaw, a weighted latch 44, pivoted to the upper end of said arm, and a stop 45, projecting through the casing between the jaws. As the slide is drawn down as far as the band will draw it, one end of the pivoted latch 44 comes in contact with the stop 45, which causes the latch to swing into horizontal position. This movement of the latch brings its weighted end into contact with the swinging jaw and causes the jaws to open. The slide is then permitted to rise a short distance under the action of the spring 34 to bring the latch 44 out of contact with the stop, so that it will be free to swing on its pivot. The weighted end of the latch 44 holds it in horizontal position during this upward movement of the carriage. When the record-slip 42 is inserted in the recorder, the lower end strikes the pointed end of the latch 44 and swings said latch into an inclined position, releasing the swinging jaw and permitting it to close upon the record-slip under the action of the spring 41.

The slip-carriage has a step-by-step motion and is controlled in its upward movement by mechanism constituting a carriage-controller, which includes a sliding bolt 46, supported between studs 47 of the casing, and a rack 48 on one side of the slide 32. This carriage-locking bolt is provided with a rigid lug 49 and a spring-pawl 50. The lug and pawl engage said rack and permit the slide to rise the distance of one tooth at each full movement of the bolt, being the length of one of the record-spaces on the record-slip, which slide is best shown in Fig. 10. The spring-pawl 50 is adapted to swing in line with the lug 49, as shown in full lines in Fig. 4. When the bolt 46 is moved so as to disengage the spring-pawl from the rack, the spring 51 throws said pawl downward into the position indicated by dotted lines in Fig. 4, ready to engage the next tooth of the rack. When the bolt is moved back, the rack is disengaged by the lug 49, and its next tooth engages the spring-pawl 50 and swings it up into alignment with the lug in position to repeat the movement, the tension of the spring 34 forcing up the slide and its rack. The slide 32 can be drawn down a distance sufficient to bring the upper tooth of the rack below the plane of the bolt 46, for the purpose of operating the jaw-opener, as before described.

A spring-lock of any suitable construction is disposed in the upper portion of the casing, and its locking-bolt 52 is adapted to engage the recesses 29 in the punching-bolts 24, for locking said punching-bolts, and consequently the upper berths, in closed positions. This locking-bolt is provided with a lateral lug 53, having a guide-rod 54, extending parallel with the bolt and passing between the guide-studs 55, disposed on the casing. A spring 56 is disposed between the lug and the guide-studs, the tendency of said spring being to thrust the bolt into locked position.

The lock is provided with a bolt-holder for holding the bolt in retracted position against the tension of the spring. This bolt-holder comprises a stud 58 on the bolt and a spring tumbler or tumblers 60, or their equivalents.

These tumblers may be pivoted on a pivot-stud 59, attached to the casing and projecting through a longitudinal slot 57 of the bolt. Each of these tumblers is recessed at its outer end and provided with a notch 61, which engages the stud 58 for holding the bolt in retracted position, and with a notch 62, which is engaged by the mechanism for releasing the bolt. A spring 63 is attached at one end to each of the tumblers and at the other end rests against a stud 64 in the casing. These springs tend to throw down the tumblers to cause them to engage the stud 58 of the locking-bolt for holding the latter in retracted position. A spur 65 on each of the tumblers opposite the notch 61 comes against the stud 58 of the bolt 52, when the tumbler is raised to relieve the bolt, and acts as a stop to prevent the tumblers from swinging too far.

Two levers 66 and 67 are pivoted on a stud 68 of the casing. These levers are of different lengths, and each is provided at its inner end with rigid vertical arms 69. The outer end of the longer lever 66 is under the vertical bolt-pocket 16 and the outer end of the shorter lever 67 is under the bolt-pocket 17. These levers have triggers 70 pivoted to their outer ends, said triggers extending through holes in the bottoms of said pockets into position to be acted upon by the punching-bolts 24 when the latter are forced down by the closing of the berth. The upper ends of the vertical arms 69 engage the notches 62 at the outer ends of the tumblers 60. Each of these levers with its arm and trigger constitutes a bolt-releaser. As the triggers are forced down by the punching-bolts on the closing of the berths, the tumblers 60 are thrown up, whereby the locking-bolt 52 is released, and the tension of the spring 56 thrusts the locking-bolt and locks the berths in closed position. In order to retract the bolt and unlock the berths, a key is inserted in the key-hole 71, Fig. 10, said key engaging the bolt or retracting mechanism therefor.

In order to prevent a berth from being unlocked before the record-slip is placed in the recorder, the lock is provided with a swinging shield or lock-closer 72, which covers the key-hole and prevents the insertion of the key until a record-slip is placed in the recorder. This shield 72 is attached to a lock-opener, which comprises a pivoted lever 73, supported on a stud 74 of the casing, a trigger-lever 75, pivoted on a stud 76 and adapted to swing into the path of the record-slip, and a connecting-rod 77, connecting the upper end of the trigger-lever 75 with the lower end of the shield-lever 73. The record-slip on insertion comes in contact with the trigger-lever and swings said lever into vertical position, thereby causing the shield-lever to swing the shield away from the key-hole.

The locking-bolt 52 of the spring-lock is connected with the sliding bolt 46, which controls the movement of the slip-carriage by means of a lever 78, pivoted on a stud 79 of the casing, said lever being pivoted at its upper end to the rear end of the locking-bolt and at its lower end to the rear end of the carriage-controlling bolt 46.

The upper berth is hinged at its back edge to the side of the car by any suitable berth-hinge and connected at its opposite ends with the roof or side of the car by the usual berth-chains or berth-spring ropes 80. The lower ends of these berth-chains are connected with the berth by springs 81, which are sufficiently stiff to sustain the weight of the berth. These berth-chains are shorter than the usual berth-chains, and when unwound to their full extent they permit the berth to open only to an inclined position approximating the horizontal. The berth-chain springs 81 contract under the weight of the passenger and permit the berth to open to its full extent.

The operation is as follows: The upper berth being closed and locked, a record-slip, as 42, (shown in Figs. 1 and 10,) having a vertical series of record-sections in its upper part, marked "upper," for the impressions of the punch for the upper berth, and a vertical series of record-sections in its lower part, marked "lower," for the impressions of the punch for the lower berth, is inserted in the slip-pocket 19, and coming in contact with the trigger-lever 75 swings it into vertical position, and thereby causes the removal of the key-hole shield from the key-hole 71 of the lock. The locking-bolt 52 of the lock is then retracted by the action of the key of the lock and caught and held in retracted position by the tumblers of the lock. This retraction of the bolt releases the punching-bolts 24, and consequently unlocks the berths and at the same time shifts the carriage-controlling bolt 46, so that its rigid lug 49 engages the rack of the carriage. The record-slip also comes in contact with and swings the latch 44, releasing the jaw 40 and causing the slip to be grasped and held between the clamping-jaws. When the beds are to be made up, the upper berth is swung open into the position shown in Fig. 8, the tension of the spring 81 being sufficient to sustain it in this position. In this movement of the berth the bolt 24 is raised, so that its cam 28 comes in contact with the lower punch 23, forcing it outward and punching a hole in the record-slip, which constitutes a record of the use of the lower berth. In case the upper berth is not sold, there will be no further action on the recorder. In case the upper berth is sold, the passenger on entering will by his weight depress the upper berth into its normal open position, as shown in Fig. 9. This depression of the upper berth again raises the bolt 24 until its cam comes in contact with the upper punch 23, which punches the record slip as a record for the upper berth. When the upper berth is closed in the morning, the punch is forced downward, and its lower end, coming in contact with the trigger 70, causes the release of the spring-lock and the locking of the berth. The sliding of the locking-bolt shifts the bolt 46, which controls the slip-carriage, so that its spring-pawl 50 engages the rack of the slip-carriage, whereby the latter is permitted to move upward the distance of one tooth, carrying the record-slip into position to receive further records.

It is obvious that one recorder may be provided for each section, or that a double recorder for two sections may be employed, as shown. In the use of a double recorder both of the adjoining upper berths are closed before the lock is released and the slip-carriage actuated.

It will be obvious that the conductor cannot open any berth without first unlocking the recorder; that he cannot unlock the recorder without first placing a record-slip therein; that he cannot take out the ticket once placed into the recorder until the ticket is exhausted, and that he cannot sell any berth for, say, five or more consecutive nights without a record for each night on the record-slip.

I claim—

1. In a sleeping-car, the combination of a section or compartment, a berth therein hinged at one side, a support for holding said berth in horizontal position, a support for holding said berth in a vertical or approximately vertical position, and a berth-recorder having a slip-pocket for a record-slip, a punch and a punch-bolt operatively connected with said berth, whereby said recorder is actuated by the swinging of said berth into open position.

2. The combination of a hinged sleeping-car berth, two berth-holders, which hold said berth in approximately open and open positions, respectively, and a berth-recorder having two recording devices and an actuating mechanism therefor operatively connected with said berth and operated in different positions thereof.

3. The combination of a hinged upper berth and a berth-recorder for sleeping-car berths, said recorder having separate punches for recording the upper and lower berths, and a sliding bolt connected with the upper berth and actuated successively by the partial opening of the upper berth and the entering of a passenger into the upper berth.

4. The combination of a hinged berth and a passenger-recorder, said recorder being provided with a bolt for actuating the recording mechanism, said bolt being operatively connected to said berth and adapted to lock the berth in closed position, and said recorder being also provided with a lock for locking said bolt.

5. The combination of a hinged berth and a recorder having a pocket for the record-slip, an actuating-bolt which locks said berth, a spring-lock for locking said actuating-bolt, a lock-closer for closing said lock, and a lock-opener having a trigger disposed in the path of the record-slip.

6. The combination of a recording mechanism, a lock for locking the actuating-bolt thereof, a step-by-step carriage for the record-slip, and a carriage-controller connected with the bolt of said lock.

7. The combination of a pocket for the record-slip, the recording mechanism, and a step-by-step carriage provided with clamping-jaws for holding the record-slip.

8. The combination of a pocket for the record-slip, the recording mechanism, a step-by-step carriage provided with clamping-jaws for holding the record-slip, and an automatic jaw-opener for said jaws.

9. The combination of the recording mechanism, a lock for locking the actuating bolt thereof, a step-by-step carriage for the record-slip, a carriage-controller connected with the bolt of the lock, and a winder for winding up the carriage.

10. The combination of a recording mechanism, a spring-lock for locking the actuating-bolt thereof, a lock-closer which holds said lock normally closed, a lock-opener having a trigger which projects into the path of the record-slip, a step-by-step carriage for the record-slip, and a carriage-controller connected with the bolt of said lock.

11. The combination of a hinged berth, a recording mechanism having an actuating-bolt which locks the berth, a spring-lock for locking said actuating-bolt, a bolt-holder for holding the bolt of the lock in retracted position, and a bolt-releaser having a trigger which is engaged by said actuating-bolt.

12. The combination of a casing provided with two bolt-pockets, a slip-pocket overlapping said bolt-pockets, two punches opposite each of said bolt-pockets, two sliding bolts within said bolt-pockets, and two upper adjoining berths connected, respectively, to said sliding bolts.

13. The combination of a casing provided with two bolt-pockets, a slip-pocket overlapping said bolt-pockets, two punches opposite each of the bolt-pockets, two sliding bolts within said bolt-pockets, two upper adjoining berths connected, respectively, to said sliding bolts, and a lock for locking both of said sliding bolts.

14. The combination of a casing provided with two bolt-pockets, a slip-pocket overlapping said bolt-pockets, two punches opposite each of the bolt-pockets, two sliding bolts within said bolt-pockets, two upper adjoining berths connected, respectively, to said sliding bolts, a spring-lock for locking both of said sliding bolts, bolt-holders, and bolt-releasers having triggers extending into said bolt-pockets.

FREDERICK EDWARD LEIBNITZ.

Witnesses:
JAMES LEWIS,
MOSE DRICKELSPIEL, Jr.